(12) United States Patent
Roberge et al.

(10) Patent No.: US 8,938,547 B1
(45) Date of Patent: Jan. 20, 2015

(54) METHOD AND SYSTEM FOR DATA USAGE ACCOUNTING IN A COMPUTING DEVICE

(71) Applicant: OpenPeak Inc., Boca Raton, FL (US)

(72) Inventors: Brian A. Roberge, Capitola, CA (US); James Asnis, Santa Cruz, CA (US); David Medina, Miami, FL (US)

(73) Assignee: OpenPeak Inc., Boca Raton, FL (US)

( * ) Notice: Subject to any disclaimer, the term of this patent is extended or adjusted under 35 U.S.C. 154(b) by 0 days.

(21) Appl. No.: 14/478,066

(22) Filed: Sep. 5, 2014

(51) Int. Cl.
*G06F 15/16* (2006.01)
*H04L 29/08* (2006.01)

(52) U.S. Cl.
CPC .............. *H04L 67/22* (2013.01); *H04L 67/141* (2013.01); *H04L 67/2814* (2013.01)
USPC ............................ 709/229; 709/227; 709/246

(58) Field of Classification Search
USPC .......................................... 709/227, 229, 246
See application file for complete search history.

(56) References Cited

U.S. PATENT DOCUMENTS

| | | | |
|---|---|---|---|
| 5,265,951 A | 11/1993 | Kumar | |
| 5,294,782 A | 3/1994 | Kumar | |
| 5,357,585 A | 10/1994 | Kumar | |
| 5,381,348 A | 1/1995 | Ernst et al. | |
| 5,386,106 A | 1/1995 | Kumar | |
| 5,484,989 A | 1/1996 | Kumar et al. | |
| 5,489,001 A | 2/1996 | Yang | |
| 5,489,773 A | 2/1996 | Kumar | |
| 5,519,783 A | 5/1996 | Kumar | |
| 5,521,369 A | 5/1996 | Kumar | |
| 5,548,477 A | 8/1996 | Kumar et al. | |
| 5,548,478 A | 8/1996 | Kumar et al. | |
| 5,616,906 A | 4/1997 | Kumar | |
| 5,632,373 A | 5/1997 | Kumar et al. | |
| 5,638,257 A | 6/1997 | Kumar et al. | |
| 5,648,760 A | 7/1997 | Kumar | |
| 5,696,496 A | 12/1997 | Kumar | |
| 5,708,560 A | 1/1998 | Kumar et al. | |
| 5,872,699 A | 2/1999 | Nishii et al. | |
| 5,902,991 A | 5/1999 | Kumar | |

(Continued)

FOREIGN PATENT DOCUMENTS

KR 00984639 B1 6/2006
WO 2010080498 A1 7/2010

(Continued)

OTHER PUBLICATIONS

International Search Report and Written Opinion for International Application No. PCT/US2009/068475, mailed on Apr. 23, 2010, 17 pages.

(Continued)

*Primary Examiner* — Shirley Zhang

(57) ABSTRACT

A method and system for data usage accounting are described herein. As an example, the method can be practiced in a setting that includes both secure applications and unsecure applications. Via one of the secure applications, a request to access data can be received in which the request is intended for a content provider via a system service. The request that is intended for the content provider via the system service can be intercepted and modified, which can cause the system service to direct the request back to the secure application instead of the content provider. In addition, a connection can be established with the content provider for the request through the secure application to enable data usage accounting of data that is returned by the content provider.

20 Claims, 4 Drawing Sheets

(56) References Cited

U.S. PATENT DOCUMENTS

| | | |
|---|---|---|
| 5,925,873 A | 7/1999 | Kumar |
| 6,023,721 A | 2/2000 | Cummings |
| 6,027,021 A | 2/2000 | Kumar |
| 6,072,401 A | 6/2000 | Kumar |
| 6,084,769 A | 7/2000 | Moore et al. |
| 6,104,451 A | 8/2000 | Matsuoka et al. |
| 6,151,606 A | 11/2000 | Mendez |
| 6,181,553 B1 | 1/2001 | Cipolla et al. |
| 6,223,815 B1 | 5/2001 | Shibasaki |
| 6,266,539 B1 | 7/2001 | Pardo |
| 6,276,448 B1 | 8/2001 | Maruno |
| 6,449,149 B1 | 9/2002 | Ohashi et al. |
| 6,457,030 B1 | 9/2002 | Adams et al. |
| 6,647,103 B2 | 11/2003 | Pinard et al. |
| 6,674,640 B2 | 1/2004 | Pokharna et al. |
| 6,708,221 B1 | 3/2004 | Mendez et al. |
| 6,799,277 B2 | 9/2004 | Colvin |
| 6,952,617 B1 | 10/2005 | Kumar |
| 6,952,671 B1 | 10/2005 | Kolesnik et al. |
| 7,039,041 B2 | 5/2006 | Robohm et al. |
| 7,058,088 B2 | 6/2006 | Tomita et al. |
| 7,120,462 B2 | 10/2006 | Kumar |
| 7,130,193 B2 | 10/2006 | Hirafuji et al. |
| 7,149,543 B2 | 12/2006 | Kumar |
| 7,184,801 B2 | 2/2007 | Farcasiu |
| 7,236,770 B2 | 6/2007 | Sankaramanchi |
| 7,243,163 B1 | 7/2007 | Friend et al. |
| 7,275,073 B2 | 9/2007 | Ganji et al. |
| 7,301,767 B2 | 11/2007 | Takenoshita et al. |
| 7,447,799 B2 | 11/2008 | Kushner |
| 7,552,196 B2 | 6/2009 | Levi et al. |
| 7,574,177 B2 | 8/2009 | Tupman et al. |
| 7,574,200 B2 | 8/2009 | Hassan et al. |
| 7,577,462 B2 | 8/2009 | Kumar |
| 7,620,001 B2 | 11/2009 | Ganji |
| 7,620,392 B1 | 11/2009 | Maurya et al. |
| 7,627,343 B2 | 12/2009 | Fadell et al. |
| 7,688,952 B2 | 3/2010 | Light et al. |
| 7,702,322 B1 | 4/2010 | Maurya et al. |
| 7,778,035 B2 | 8/2010 | Huang et al. |
| 7,788,382 B1 | 8/2010 | Jones et al. |
| 7,823,214 B2 | 10/2010 | Rubinstein et al. |
| 7,869,789 B2 | 1/2011 | Hassan et al. |
| 7,885,645 B2 | 2/2011 | Postma et al. |
| 7,890,091 B2 | 2/2011 | Puskoor et al. |
| 7,912,994 B2 | 3/2011 | Cornwell et al. |
| 7,970,386 B2 | 6/2011 | Bhat et al. |
| 7,992,084 B2 | 8/2011 | Ozawa |
| 8,000,736 B2 | 8/2011 | Forstall et al. |
| 8,010,701 B2 | 8/2011 | Wilkinson et al. |
| 8,012,219 B2 | 9/2011 | Mendez et al. |
| 8,054,211 B2 | 11/2011 | Vidal |
| 8,060,074 B2 | 11/2011 | Danford et al. |
| 8,078,157 B2 | 12/2011 | Maurya et al. |
| 8,086,332 B2 | 12/2011 | Dorogusker et al. |
| 8,099,090 B2 | 1/2012 | Postma et al. |
| 8,180,893 B1 | 5/2012 | Spertus |
| 8,181,264 B2 | 5/2012 | Linn et al. |
| 8,185,149 B2 | 5/2012 | Forstall et al. |
| 8,199,507 B2 | 6/2012 | Shohet et al. |
| 8,254,902 B2 | 8/2012 | Bell et al. |
| 8,272,048 B2 | 9/2012 | Cooper et al. |
| 8,375,369 B2 | 2/2013 | Mensch et al. |
| 8,484,728 B2 | 7/2013 | De Atley et al. |
| 8,549,656 B2 | 10/2013 | Blaisdell et al. |
| 8,601,579 B2 | 12/2013 | Kristic et al. |
| 8,695,060 B2 | 4/2014 | Wade et al. |
| 2001/0047363 A1 | 11/2001 | Peng |
| 2002/0013852 A1 | 1/2002 | Janik |
| 2002/0172336 A1 | 11/2002 | Postma et al. |
| 2003/0002637 A1 | 1/2003 | Miyauchi et al. |
| 2003/0090864 A1 | 5/2003 | Kuo |
| 2003/0130984 A1 | 7/2003 | Quinlan et al. |
| 2003/0229718 A1* | 12/2003 | Tock et al. ............ 709/246 |
| 2004/0034853 A1 | 2/2004 | Gibbons et al. |
| 2004/0052343 A1 | 3/2004 | Glaser et al. |
| 2004/0060687 A1 | 4/2004 | Moss, II |
| 2004/0078812 A1 | 4/2004 | Calvert |
| 2004/0098449 A1 | 5/2004 | Bar-Lavi et al. |
| 2004/0162092 A1 | 8/2004 | Marsico et al. |
| 2004/0190256 A1 | 9/2004 | Genova et al. |
| 2005/0107114 A1 | 5/2005 | Ocock |
| 2005/0131885 A1 | 6/2005 | Komatsu et al. |
| 2005/0144445 A1 | 6/2005 | Yeap et al. |
| 2005/0149726 A1 | 7/2005 | Joshi et al. |
| 2005/0188318 A1 | 8/2005 | Tamir et al. |
| 2005/0213331 A1 | 9/2005 | Lewis |
| 2006/0030341 A1 | 2/2006 | Pham |
| 2006/0143250 A1 | 6/2006 | Peterson et al. |
| 2006/0184788 A1 | 8/2006 | Sandhu et al. |
| 2006/0200658 A1 | 9/2006 | Penkethman |
| 2006/0277209 A1 | 12/2006 | Kral et al. |
| 2006/0277311 A1 | 12/2006 | Franco et al. |
| 2007/0080823 A1 | 4/2007 | Fu et al. |
| 2007/0093243 A1 | 4/2007 | Kapadekar et al. |
| 2007/0156870 A1 | 7/2007 | McCollum |
| 2007/0165654 A1 | 7/2007 | Chai et al. |
| 2007/0169105 A1 | 7/2007 | Amberny et al. |
| 2007/0183772 A1 | 8/2007 | Baldwin et al. |
| 2007/0239878 A1 | 10/2007 | Bowers et al. |
| 2007/0294380 A1 | 12/2007 | Natarajan et al. |
| 2008/0060085 A1 | 3/2008 | Samzelius et al. |
| 2008/0070495 A1 | 3/2008 | Stricklen et al. |
| 2008/0115225 A1 | 5/2008 | Jogand-Coulomb et al. |
| 2008/0125079 A1 | 5/2008 | O'Neil et al. |
| 2008/0134325 A1 | 6/2008 | Kim et al. |
| 2008/0140969 A1 | 6/2008 | Lawrence |
| 2008/0201453 A1 | 8/2008 | Assenmacher |
| 2008/0222621 A1 | 9/2008 | Knight et al. |
| 2008/0281953 A1 | 11/2008 | Blaisdell |
| 2009/0150970 A1 | 6/2009 | Hinds et al. |
| 2010/0077035 A1 | 3/2010 | Li et al. |
| 2010/0157543 A1 | 6/2010 | Shohet et al. |
| 2010/0157989 A1 | 6/2010 | Krzyzanowski et al. |
| 2010/0157990 A1 | 6/2010 | Krzyzanowski et al. |
| 2010/0159898 A1 | 6/2010 | Krzyzanowski et al. |
| 2010/0222097 A1 | 9/2010 | Gisby et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332635 A1 | 12/2010 | Rogel et al. |
| 2010/0333088 A1 | 12/2010 | Rogel et al. |
| 2011/0004941 A1 | 1/2011 | Mendez et al. |
| 2011/0029779 A1 | 2/2011 | Sekiya et al. |
| 2011/0038120 A1 | 2/2011 | Merz et al. |
| 2011/0058052 A1 | 3/2011 | Bolton et al. |
| 2011/0082789 A1 | 4/2011 | Boyd |
| 2011/0082900 A1 | 4/2011 | Nagpal et al. |
| 2011/0093583 A1 | 4/2011 | Piemonte et al. |
| 2011/0145932 A1 | 6/2011 | Nerger et al. |
| 2011/0167492 A1* | 7/2011 | Ghosh et al. ............ 726/23 |
| 2011/0179483 A1 | 7/2011 | Paterson et al. |
| 2011/0225252 A1 | 9/2011 | Bhat et al. |
| 2012/0066223 A1 | 3/2012 | Schentrup et al. |
| 2012/0070017 A1 | 3/2012 | Dorogusker et al. |
| 2012/0088481 A1 | 4/2012 | Postma et al. |
| 2012/0096364 A1 | 4/2012 | Wilkinson et al. |
| 2012/0096365 A1 | 4/2012 | Wilkinson et al. |
| 2012/0102564 A1 | 4/2012 | Schentrup et al. |
| 2012/0102574 A1 | 4/2012 | Schentrup et al. |
| 2012/0117274 A1 | 5/2012 | Lydon et al. |
| 2012/0151464 A1 | 6/2012 | Koren et al. |
| 2012/0159567 A1 | 6/2012 | Toy et al. |
| 2012/0185767 A1 | 7/2012 | Schlegel |
| 2012/0185879 A1 | 7/2012 | Van Vechten et al. |
| 2012/0210443 A1 | 8/2012 | Blaisdell et al. |
| 2012/0246484 A1 | 9/2012 | Blaisdell et al. |
| 2012/0246731 A1 | 9/2012 | Blaisdell et al. |
| 2012/0296744 A1 | 11/2012 | Cue et al. |
| 2012/0304280 A1 | 11/2012 | Hayashida |
| 2012/0304310 A1 | 11/2012 | Blasidell |
| 2012/0309348 A1 | 12/2012 | De Atley et al. |
| 2012/0311697 A1 | 12/2012 | Swingler et al. |
| 2012/0311702 A1 | 12/2012 | Krstic et al. |

(56) References Cited

U.S. PATENT DOCUMENTS

| | | | |
|---|---|---|---|
| 2013/0055341 | A1 | 2/2013 | Cooper et al. |
| 2013/0130652 | A1 | 5/2013 | Deasy et al. |
| 2013/0132941 | A1 | 5/2013 | Lindeman et al. |
| 2013/0145278 | A1 | 6/2013 | Newell et al. |
| 2013/0145448 | A1 | 6/2013 | Newell |
| 2013/0254401 | A1 | 9/2013 | Marshall et al. |
| 2013/0260713 | A1 | 10/2013 | Toy et al. |
| 2013/0260730 | A1 | 10/2013 | Toy et al. |
| 2013/0316703 | A1* | 11/2013 | Girard et al. ............... 455/432.1 |
| 2014/0059525 | A1 | 2/2014 | Jawa et al. |
| 2014/0059573 | A1 | 2/2014 | Jawa et al. |
| 2014/0059703 | A1 | 2/2014 | Hung et al. |
| 2014/0082641 | A1 | 3/2014 | Clark |
| 2014/0089376 | A1 | 3/2014 | Caldas et al. |
| 2014/0089487 | A1 | 3/2014 | Debate |
| 2014/0173747 | A1 | 6/2014 | Govindaraju |
| 2014/0177839 | A1 | 6/2014 | Wagner et al. |
| 2014/0181518 | A1 | 6/2014 | Kim et al. |
| 2014/0181803 | A1 | 6/2014 | Cooper et al. |

FOREIGN PATENT DOCUMENTS

| | | |
|---|---|---|
| WO | 2010080500 A1 | 7/2010 |
| WO | 2012024418 A1 | 2/2012 |
| WO | 2012037064 A1 | 3/2012 |
| WO | 2012061046 A2 | 5/2012 |
| WO | 2012061047 A1 | 5/2012 |
| WO | 2012064870 A2 | 5/2012 |

OTHER PUBLICATIONS

International Search Report and Written Opinion for International Application No. PCT/US2009/068482, mailed on Feb. 23, 2010, 12 pages.

International Search Report and Written Opinion for International Application No. PCT/US2011/051302, mailed on Jan. 26, 2012, 2 pages.

International Search Report and Written Opinion for International Application No. PCT/US2011/057351, mailed on May 9, 2012, 10 pages.

International Search Report and Written Opinion for International Application No. PCT/US2011/057354, mailed on May 9, 2012, 10 pages.

International Search Report for Int'l Appln. No. PCT/US2011/38184, mailed on Aug. 26, 2011, 2 pages.

International Search Report and Written Opinion for Int'l Appln. No. PCT/US2011/060023, mailed on May 25, 2012, 10 pages.

International Search Report and Written Opinion for Int'l Appln. No. PCT/US2011/048109, mailed on Dec. 12, 2011, 10 pages.

International Search Report and Written Opinion for Int'l Appln. No. PCT/US2012/045923, mailed on Oct. 4, 2012, 8 pages.

A Closer Look at Horizon App Manager Printout from Website: http://www.horizonmanager.com/?page_id=211 Copyright 2011 VMware, Inc.

Fulton, S.M., "Xerox Goes Up Against RIM in 'BYOD' Mobile Device Management," dated Feb. 22, 2012 [retrieved Aug. 2, 2012] retrieved from the Internet: <http://www.readwriteweb.com/cloud/2012/02/xerox-goes-up-against-rim-in-b.php>, 4 pgs.

International Search Report and Written Opinions for International Patent Application No. PCT/US2012/058689, mailed on Mar. 21, 2013, 13 pages.

Non-Final Office Action for U.S. Appl. No. 13/626,470, dated Jan. 6, 2014, 7 pages.

Amendment and Reply for U.S. Appl. No. 13/626,470, mailed Jan. 16, 2014, 21 pages.

* cited by examiner

METHOD AND SYSTEM FOR DATA USAGE ACCOUNTING IN A COMPUTING DEVICE

FIELD OF TECHNOLOGY

The present description relates to methods and systems for data usage accounting and more particularly, to methods and systems for data usage accounting in computing devices with secure enterprise applications and personal applications.

BACKGROUND

In an effort to increase productivity, many employers allow their workers to conduct business related to the employer on their personal mobile devices. In some cases, employers also provide some of their employees with company-issued mobile devices. In either arrangement, an employer understands that a single device may include sensitive data related to that employer in addition to data that is personal to the employee. Several advances have been made in an effort to protect an employer's data in these circumstances. For example, OpenPeak Inc. of Boca Raton, Fla. has developed solutions that enable a mobile device to include both enterprise and personal data but that isolate the enterprise data from the personal data. As part of these solutions, an employee may download secure applications that may be used to conduct transactions related to the enterprise.

Because the employee's device may include both personal and secure applications, it may be necessary to bifurcate the process of data usage accounting. In particular, the employer may wish to receive an accounting of the data usage associated with the secure applications that have been installed on the employee's device on behalf of the employer. This accounting may be separate from data accounting that may be attributable to unsecure applications that the employee may have installed for personal use. Unfortunately, there is no solution available for tracking data usage with respect to certain system services that may be requested by the secure applications.

SUMMARY

A method of data usage accounting is described herein. This method may be particularly applicable in a setting that includes both secure applications and unsecure applications, although it is not limited to such a configuration. Via one of the secure applications, a request to access data can be received in which the request is intended for a content provider via a system service. The request that is intended for the content provider via the system service can be intercepted and modified to cause the system service to direct the request back to the secure application instead of the content provider. Further, a connection can be established with the content provider for the request through the secure application to enable data usage accounting of data that is returned by the content provider. An amount of data that is carried over the established connection and that is associated with the secure application can be determined. As an example, the amount of data that is determined in relation to the secure application can be separate from an amount of data that is determined on behalf of one or more unsecure applications.

Establishing the connection with the content provider can include establishing a secure connection with the content provider through the secure application. As an example, the secure connection with the content provider can be a virtual private network (VPN) connection that is individual to the secure application. The method can also include the steps of receiving content from the content provider at the secure application and forwarding the received content from the content provider to the system service for processing. As another example, modifying the intercepted request can include modifying an original uniform resource identifier (URI) of the request by changing the URI associated with the content provider.

In another embodiment, the method can also include the steps of receiving data from the content provider over the established connection and reading the data to determine whether a redirect from the content provider is present. If (or when) a redirect from the content provider is detected, the redirect from the content provider can be modified to ensure that the system service will direct the redirect to the secure application. Receiving data from the content provider may include receiving from the content provider a playlist that includes a plurality of original URIs, and modifying the redirect can include modifying at least some of the URIs of the playlist. In one non-limiting example, the system service can be a media playback service, and the media playback service is a system application that is also an unsecure application.

Another method of data usage accounting in a computing device that has one or more secure applications installed thereon is presented herein. This method can include the steps of receiving an original URI request through one of the secure applications, intercepting the original URI request and modifying the original URI request such that the modified original URI request is to be directed back to the secure application once the modified original URI request has been initially processed by a system service. The method can also include the step of tracking data usage associated with the modified original URI request.

In one embodiment, the modified original URI request can be converted back to the original URI request and a connection can be established between the secure application and a content provider for the original URI request. The computing device can also have one or more unsecure applications installed thereon. Tracking data usage associated with the modified original URI can include tracking data usage associated with the modified original URI through the secure application. The method can also include the step of segregating the data usage tracking associated with the modified original URI from data usage tracking associated with the unsecure applications. Moreover, establishing the connection between the secure application and the content provider can include establishing a secure connection between the secure application and the content provider. As an example, the secure connection can be individual to the secure application.

Yet another method of data usage accounting on a computing device is described herein. On a computing device that has secure applications and unsecure applications installed thereon, multiple sessions of the secure applications can be conducted. An amount of data that is consumed during the sessions of the secure applications can be determined. A data usage total can be tallied for the secure application sessions such that the data usage total for the secure applications is separate from a data usage total associated with the unsecure applications.

A computing device is also described herein. The computing device can include a display that is configured to display both secure and unsecure applications that are installed on the computing device. The device can also include a processing unit that is communicatively coupled to the display. The processing unit can be configured to receive a data access request through one of the secure applications in which the data request is supported by an unsecure application that is a system service of the computing device. The processing unit can also be configured to cause the data access request to be intercepted prior to processing by the unsecure application and to cause the data access request to be modified. Such a modification can cause the unsecure application to direct the data access request to the secure application instead of an intended location of the data access request. The processing unit can also be configured to cause a connection between the secure application and the intended location of the data access request to be established. The computing device may also include a calculation unit communicatively coupled to the processing unit. The calculation unit can be configured to determine an amount of data that is associated with the data access request through the secure application.

As an example, the connection between the secure application and the intended location of the data access request can be a VPN connection that is individual to the secure application. As another example, the data access request can be a uniform resource locator (URL) based on hypertext transfer protocol (HTTP) or hypertext transfer secure protocol secure (HTTPS). The computing device can also include memory that can be associated with the secure application and can be configured to store the data access request for mapping the data access request to the modified data access request. In one embodiment, the processing unit can be further configured to convert the modified data access request back to its original form to establish the connection between the secure application and the intended location.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
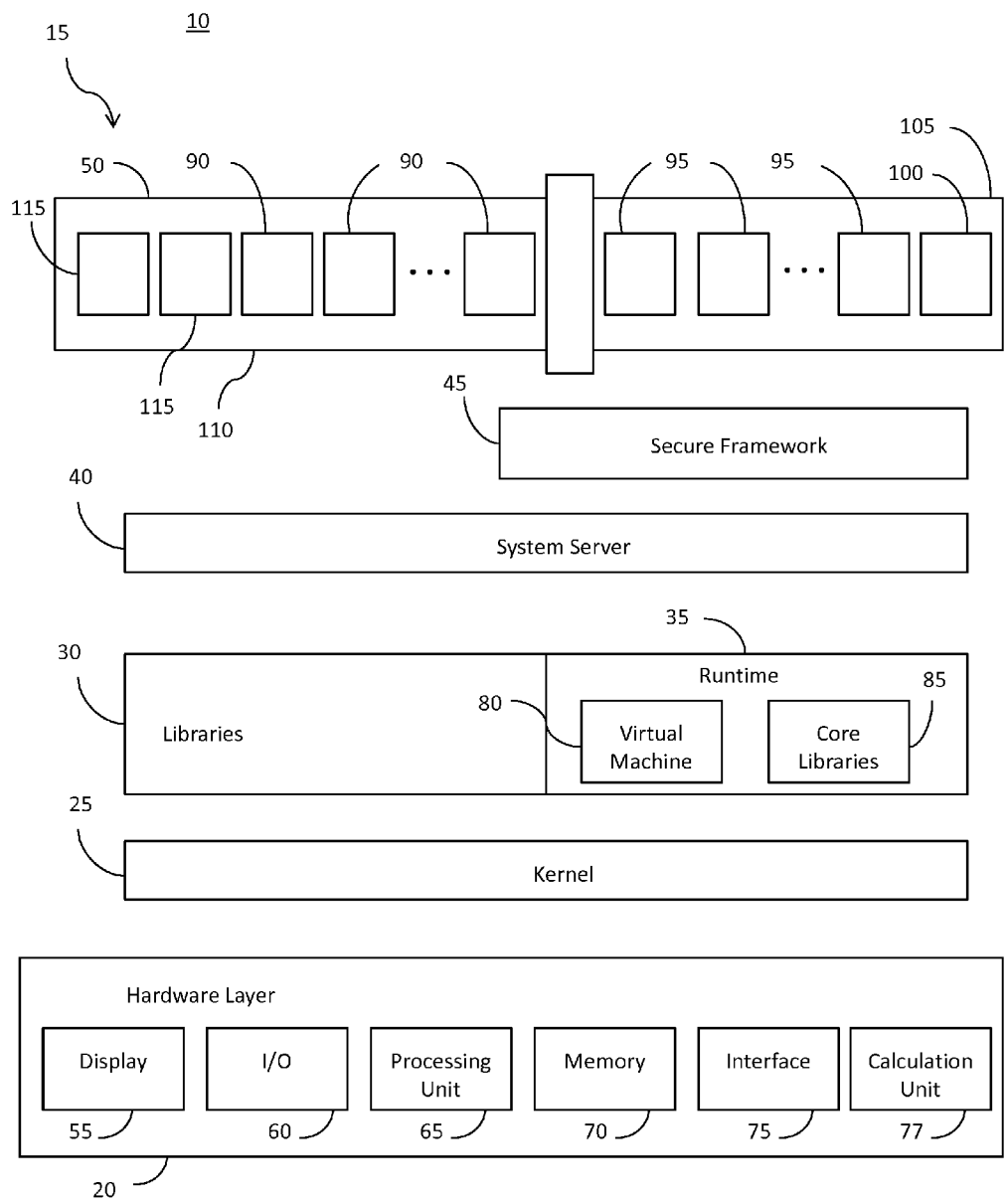
FIG. 1 illustrates an example of a block diagram of the system architecture of a computing device that is configured to practice the subject matter described herein.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described. The word "among," as it is used throughout this description, should not necessarily be interpreted as requiring exchanges or interaction among three or more applications, irrespective of grammar rules. The word "a" is not necessarily limited to a singular instance of something, as it may mean one or more.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged (directly or indirectly) between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The term "computer readable storage medium" is defined as one or more components that are configured to store instructions that are to be executed by one or more processing units.

An "application" is defined as a program or programs that perform one or more particular tasks on a computing device. Examples of an application include programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" or "processor" is defined as one or more components that execute sets of instructions, and the components may be disparate parts or part of a whole unit and may not necessarily be located in the same physical location.

The terms "memory," "memory element" or "repository" are defined as one or more components that are configured to store data, either on a temporary or persistent basis. The term "shared memory" is memory, a memory element or a repository that is accessible (directly or indirectly) by two or more applications or other processes. An "interface" is defined as a component or a group of components that enable(s) a device to communicate with one or more different devices, whether through hard-wired connections, wireless connections or a combination of both. An "input/output device" is defined as a device that is configured to at least receive input from a user or a machine that is intended to cause some action or other effect on a component with which the input device is associated. A "display" is defined as an apparatus that presents information in visual form and may or may not receive input through a touch screen.

The term "file system" is defined as an abstraction that is used to organize, store and retrieve data. The term "secure application" is defined as an application that has been modified from its original form to restrict communications between the application and unauthorized programs, applications or devices and to restrict operation of the application based on policy or to alter, augment or add features associated with the operation of the application (or any combination thereof) or —in the case of the application not being modified—an application that is part of a secure workspace that is protected from data exchanges with applications that are part of a personal or an unsecure workspace. A "target application" is defined as an application that has been selected for conversion into a secure application. An "unsecure application" is defined as an application that has not undergone the modification required to convert the application into a secure application and, as such, is unable to obtain data from a secure application in view of an obfuscation scheme employed by that secure application or is an application that is not part of a secure workspace and is restricted from accessing data from the secure workspace. A "virtual machine" is defined as a platform-independent execution environment that emulates a physical machine.

The term "personal workspace" is defined as a workspace, profile or partition that is configured to contain the personal content and unsecure applications or other unsecure programs associated with a user of a computing device on which the personal workspace sits. The term "secure workspace" is defined as a workspace, profile or partition that is configured to contain secure content, secure applications and other secure programs and requires some form of authentication to be accessed.

The term "content provider" is defined as a site that offers data for consumption by a computing device. The term "system service" is defined as an application or a set of applications on a computing device that offer one or more features for access by an unsecure application or a secure application. A "secure connection" is defined as a connection in which at least some portion of the data that is exchanged over the connection is encrypted or otherwise obfuscated from unauthorized parties, entities or processes. To "consume data" means to receive data from a source, transmit data to a recipient or both.

As explained earlier, solutions have been developed that enable a mobile device to include both personal and enterprise data. Accordingly, it may be useful to segregate data usage accounting associated with the enterprise side from usage associated with the personal space. This process can enable an enterprise to determine how much data that is consumed by the mobile device is the responsibility of the enterprise.

In view of this need, a method and system for data usage accounting are described herein. As an example, the method can be practiced in a setting that includes both secure applications and unsecure applications. Via one of the secure applications, a request to access data can be received in which the request is intended for a content provider via a system service. The request that is intended for the content provider via the system service can be intercepted and modified, which can cause the system service to direct the request back to the secure application instead of the content provider. In addition, a connection can be established with the content provider for the request through the secure application to enable data usage accounting of data that is returned by the content provider.

Through this arrangement, data tracking can be conducted for virtually any secure application or otherwise any application associated with an enterprise. This tracking can also be kept apart from any accounting performed for a user's personal usage. Accordingly, an enterprise can accurately determine its accountability for data usage by a computing device that includes both enterprise and personal data.

Referring to FIG. 1, an example of a block diagram 10 of the system architecture of a computing device 15 is shown. In this arrangement, the computing device 15 can include a hardware layer 20, a kernel layer 25 and a libraries layer 30, which may include a plurality of native libraries. This architecture may also include a runtime environment 35, a system server 40, a secure framework 45 and an application layer 50.

In one arrangement, the hardware layer 20 may include any number and type of hardware components, such as one or more displays 55, one or more input/output (I/O) devices 60, one or more processing units 65 and any suitable type and number of memory devices 70 and interfaces 75. Examples of the I/O devices 60 include speakers, microphones, physical keypads, etc. In addition, the display 55 can serve as an I/O device 60 in the form of a touch-screen display. The interfaces 75 can be configured to support various types of communications, including wired or wireless and through any suitable type of standards and protocols. In one arrangement, the hardware layer 20 may also include a calculation unit 77, which can be configured to calculate or determine (or at least assist in the determination or calculation of) data usage totals associated with any type of session conducted on the computing device 15, including those originating from the application layer 50. The calculation unit 77 may be a separate component or may be part of the processing unit 65. In another arrangement, the calculation unit 77 may be remotely located such that it is external to the computing device 15. In such a case, information regarding the sessions may be sent to a remote location that supports the calculation unit 77, and the unit 77 can perform its calculation functions once it receives the information.

In addition, the runtime environment 35 can support any suitable number of virtual machines 80 and core libraries 85, although a virtual machine may not be needed in other arrangements, such as where native code is employed. The system server 40 can serve as an abstraction for the underlying layers for the applications in the application layer 50 and can provide numerous system services for the applications. In this example, the application layer 50 may include any number of unsecure applications 90 and any number of secure applications 95, one of which may be a core secure application 100. The secure framework 45 can function in a manner similar to that of a conventional framework, but the secure framework 45 can facilitate the encapsulation of a number of secure applications 95 to selectively restrict their data exchanges with the unsecure applications 90. In particular, the secure framework 45 can be configured to intercept and modify certain calls from the secure applications 95, prior to passing them to the system server 40.

In many cases, the unsecure applications 90 are associated with the personal data of a user of the computing device 15. In contrast, the secure applications 95 are typically associated with confidential or otherwise sensitive information that belongs to or is associated with an enterprise or some other organization, and the user of the device 15 may work for such an entity. In one arrangement, a virtual partition or workspace may be created on the computing device 15 in which the secure applications 95 (and the core secure application 100) are part of a secure workspace 105, and the unsecure applications 90 are part of a personal workspace 110. In certain cases, a user may be required to provide authentication information, such as a password, PIN or biometric data, to gain access to the secure workspace 105 or to any individual or group of secure applications 95.

In some cases, some of the unsecure applications 90 may be system services 115 that provide features or functionality that is associated with the type of operating system that is installed on the computing device 15. In some cases, the system service 115 may be an application or a set of applications that live in the background and support different tasks associated with the operating system of the device 15. System services 115 may facilitate the exposure of low-level functions of the hardware layer 20 and the kernel layer 25 to the higher-level application layer 50. Many system services 115 may operate with elevated privileges, in comparison to other applications. For example, a common system service 115 that is typically found on computing devices 15 is a media player, which processes and presents media data for a user. Another example of a system service 115 may be a photo viewer, which presents digital images for the user. As those skilled in the art will appreciate, the examples listed here are not meant to be limiting, and there are other system services 115 that may be available on the computing device 15.

In another embodiment, the system services 115 may be trusted unsecure applications 90 that secure applications 95 are permitted to share or otherwise exchange data with. An example of a trusted unsecure application 90 may be an unsecure application 90 that is by default installed on the computing device 15, such as by the manufacturer of the device 15 or a wireless carrier or other entity that provides services to the device 15. Another example of a trusted unsecure application 90 may be an unsecure application 90 that is listed on an application whitelist for one or more secure applications 95. By being part of the application whitelist, the trusted unsecure application 90 may be preapproved for data exchange with the relevant secure application(s) 95. Additional information on application whitelisting can be found in U.S. patent application No. 61/973,898, filed on Apr. 2, 2014, which is incorporated by reference herein in its entirety.

As noted above, the secure applications 95 and the system architecture may be configured to enable at least some of the calls to the system server 40 to be intercepted. There are several processes available for such a process. For example, U.S. patent application No. 62/033,142, which was filed on Aug. 5, 2014 and is herein incorporated by reference in its entirety, describes a method and system in which some of the system classes are overridden by classes associated with the core secure application 100, which can allow runtime hooks to be applied against certain system calls. Based on this technique, some of the calls that the secure applications 95 make to the system services 115 can be intercepted and modified, a process that will described below.

As another example, U.S. patent application Ser. No. 14/205,661, which was filed on Mar. 12, 2014, and U.S. patent application Ser. No. 14/205,686, which was also filed on Mar. 12, 2014, each of which is herein incorporated by reference in its entirety, present methods and systems by which target applications are encapsulated as secure applications for distribution. Once installed and initiated on a computing device 15, the encapsulated application described in these references is loaded into memory, and runtime hooks are set to enable application programming interface (API) calls from the secure application to be intercepted. Similar to the description above, at least some of the calls to the system services 115 from the secure applications 95 can be modified once they are intercepted. Other information on the process of intercepting certain functions of secure applications can be found in U.S. Pat. No. 8,695,060, issued on Apr. 8, 2014, which is also herein incorporated by reference in its entirety.

As described in these incorporated references, a secure application 95 can be configured to provide additional features that may not have been otherwise available prior to it being converted into a secure application 95. As an example, a secure application 95 can be arranged to track the amount of data that it uses for a particular session. This process enables an administrator to determine data usage on a per-application basis. Of course, secure applications 95 may be managed in accordance with many other policies or configurations, as is known in the art.

While many applications (or target applications) are able to be converted into secure applications 95, there are some applications that may not be so modified. For example, many system services 115 are default applications that are provided as part of the base configuration of the computing device 15. The developer of the operating system that provides these system services 115 may not permit the system services 115 to be converted into secure applications 95. As such, many system services 115 may remain as unsecure applications 90 on the computing device 15. Accordingly, the operation of a system service 115 may not be amenable to being controlled or managed, as is the case with secure applications 95. The relevance of this condition will be explained below.

Figure 2:
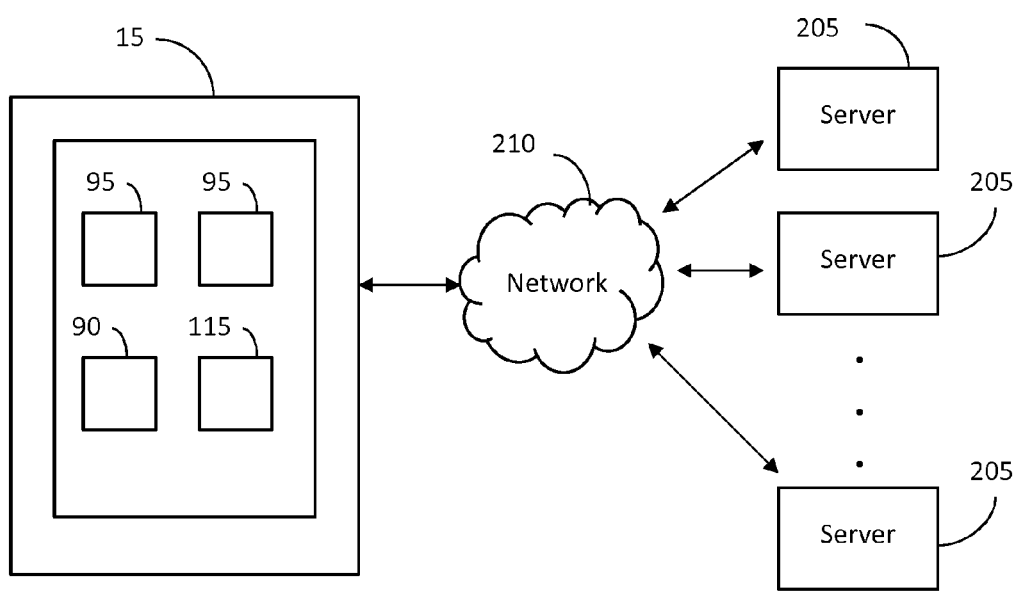
FIG. 2 illustrates an example of a system that shows the computing device of FIG. 1 in communication with one or more remote servers.

Referring to FIG. 2, a system 200 that shows the computing device 15 in communication with one or more remote servers 205 is shown. One or more communication networks 210 may facilitate the communications between the computing devices 15 and the remote servers 205. In this example, the computing device 15 may be a mobile computing device, although the principles described herein may apply to desktop computers or other fixed equipment. In addition, a mobile computing device may be, for example, a smartphone, laptop, tablet or other devices that may be carried by an individual. The network(s) 210 may be composed of various types of components to support wireless or wired communications (including both). The network(s) 210 may also be configured to support local or wide area communications (or both). The remote servers 205 may host any number of web sites that offer content that may be retrieved by the computing device 15 and may also be configured to accept data from the computing device 15. Because the servers 205 offer content, they may also be referred to as content providers, although the term "content provider" is certainly not limited to this particular example.

When operating the computing device 15, a user may wish to access data from any one of the remote servers 205. In some cases, the data access request may originate from an unsecure application 90. In the standard flow, the unsecure application 90 may sometimes forward the request to a relevant system service 115. For example, if a user wishes to view a video associated with one of the remote servers 205 through an unsecure application 90, the unsecure application 90 passes the request to a media player of the computing device 15. The media player then retrieves the data from the appropriate server 205 and presents such data to the user.

In the case of a secure application 95, a similar request would normally be passed to the media player, as well. In addition, the media player would conventionally establish a connection with the relevant remote server 205 and would present the requested data to the user. But because the system services 115 are typically not permitted to be converted into secure applications 95, implementing the feature of data accounting in them, as can be done with secure applications 95, may not be possible. In this instance, difficulties are presented in determining the percentage of data usage that is associated with secure applications 95 in comparison to the consumption of data by unsecure applications 90.

A solution is described here, however, that enables such an accounting to take place. In particular, the initial data request from the secure application 95 can be intercepted and modified prior to being passed to the media player. In view of the modification, the media player (or other system service 115) can direct the request back to the secure application 95, and a connection can be established between the secure application 95 and the appropriate remote server 205 to facilitate the exchange of data between the secure application 95 and the remote server 205. This redirection of the request through the secure application 95 can enable an accounting of the amount of data that is associated with this particular session, a feature that can be incorporated into secure applications 95. Accordingly, an accurate accounting of data usage associated with at least some or all secure applications 95 on the computing device 15 is now possible.

This arrangement can enable an entity to determine the percentage of data usage that is attributable to it and to the user on a personal basis. Because data usage may be segregated between enterprise use and personal use, the enterprise may be able to craft more accurate data plans with wireless carriers or other similar entities. Moreover, the user, who may own the computing device 15, would understand that the user would not be charged for data usage associated with that user's work or business and that the user would only be paying for personal data consumption.

Figure 3:
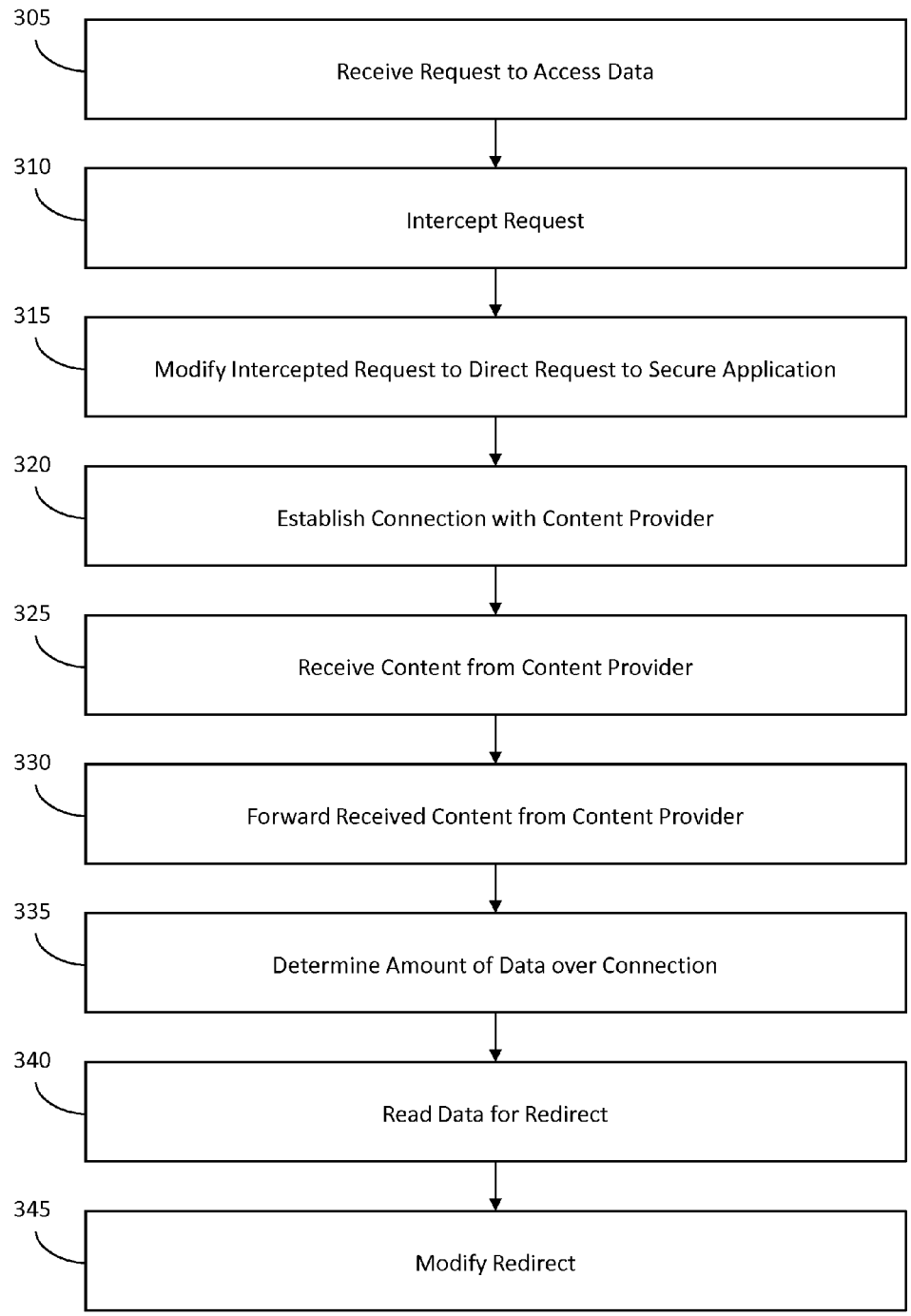
FIG. 3 illustrates an example of a method for data usage accounting.

Referring to FIG. 3, a method 300 of data usage accounting is shown. The method 300, however, may include additional or even fewer steps or processes in comparison to what is illustrated in FIG. 3. Moreover, the method 300 is not necessarily limited to the chronological order that is shown in FIG. 3. In describing the method 300, reference may be made to FIGS. 1, 2 and 4, although it is understood that the method 300 may be practiced with any other suitable systems and components and may take advantage of other suitable processes.

At step 305, in a setting that includes both secure applications and unsecure applications, a request to access data can be received via one of the secure applications in which the request is intended for a content provider via a system service. The request intended for the content provider via the system service can be intercepted, as shown at step 310. At step 315, the intercepted request can be modified, which can cause the system service to direct the request back to the secure application instead of the content provider. A connection can be established with the content provider for the request through the secure application to enable data usage accounting of data that is returned by the content provider, as shown at step 320. Additionally, at step 325, content from the content provider can be received at the secure application, and the received content from the content provider can be forwarded to the system service for processing, as shown at step 330. An amount of data that is carried over the established connection associated with the secure application can be determined, as shown at step 335.

Figure 4:
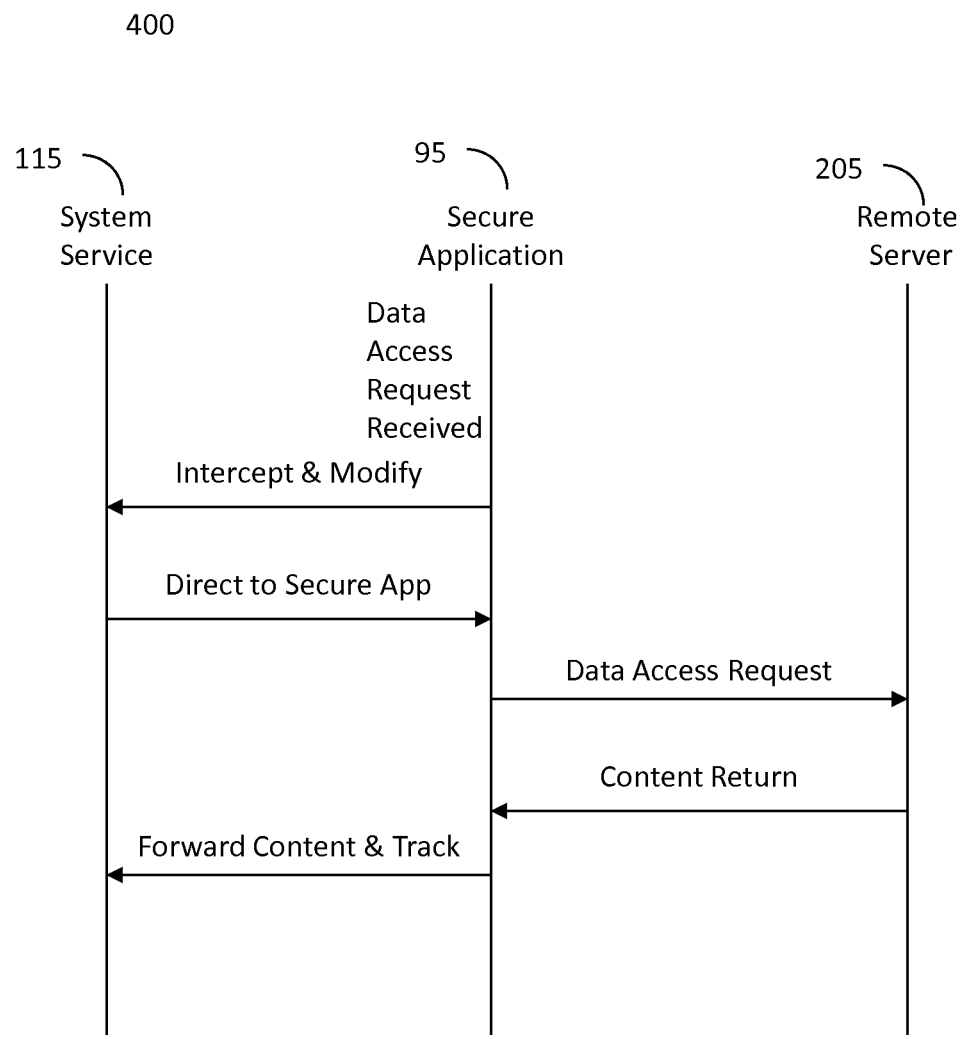
FIG. 4 illustrates an example of an interaction between a secure application, a remote server and a system service.

Referring to FIGS. 1 and 2, a user may wish to access data through, for example, a secure application 95 that is installed on the computing device 15. As an example, the user may desire to retrieve some type of content, such as video, through the secure application 95. The content may need to be retrieved from one of the remote servers 205. Conventionally, the data access request would be passed to the relevant system service 115 and the system service 115 would fetch the content from the remote server 205. Here, however, the data access request may be intercepted prior to being handled by the operating system and can be modified to direct the request back to the secure application 95 instead of the remote server 205. Reference will be made to FIG. 4 to help explain this process.

In FIG. 4, an example of an interaction 400 between the secure application 95, the system service 115 and the remote server 205 is shown. In the initial step, the data access request is received and is intercepted and modified. In this example, the data access request is for video that is stored at one of the remote servers 205 that is associated with a website or some other form of digital content, and the system service 115 is a media playback application. As such, in accordance with earlier discussion, the API that is associated with the media playback service can be hooked.

Based on conventional techniques, the uniform resource indicator (URI) related to this data request may be a uniform resource locator (URL) with the associated content available via the hypertext transfer protocol (HTTP) or the hypertext transfer protocol secure (HTTPS). As part of the modification process, the URL may be changed prior to being passed to the system service 115. The modification of the URL, in one embodiment, may be based on a port number that is provided by the operating system. For example, the secure application 95 may create a listening socket on a loopback interface by requesting a socket and port number from the operating system. As is known in the art, the loopback interface can support inter-process or inter-app communications on the computing device 15. The requested port may be a predetermined value or may be simply a request to the operating system to provide an available port number. Continuing with the example, the URL may be converted into a local-host URL that includes the assigned port number and the rest of the information from the original URL. The modified URL may then be passed across to the system service 115, in this case, the media player. As will be explained later, multiple listening sockets and ports may be requested from the operating system as part of this process.

Consider the following specific but non-limiting example. A user may select a link through a secure application 95, which may have the following exemplary URL associated with it:

http://www.youttube.com/watch?v=uWHRqspFke0

As noted earlier, the secure application 95 may request a socket and port value from the operating system, and the port value can factor into the modified URL. In this example, the original URL may be transformed into the following local-host URL:

http://localhost:4444?t=www.youtube.com&p=watch&r=v=uWHRqspFke0

Here, the port value "4444" is now part of the URL string, which can cause the system service 115 to point back to this port created by the secure application 95. In addition, as can be seen, the original hostname can be encoded in the "t=" parameter, the original path can be encoded in the "p=" parameter and the original parameters can be encoded in the "r=" parameter. Thus, the modified URL can include the port value, and the remote information can be added as parameters in the modified URL. A similar example for an HTTPS request will be presented below.

In some arrangements, as part of this process, the secure application 95 can create a proxy when the data is initially requested through the secure application 95. The proxy can act as the intermediary between the system service 115 and the remote server 205. In doing so, the proxy may listen in on any sockets that were created for the overall modification of the data access request. As an example, each secure application 95 can be individually configured to generate the proxy for relevant data requests that it receives.

In another arrangement, the secure application 95 may record a copy of the information associated with the original data request and can map that information to the redirect address that has been created. For example, in the example above, the secure application 95 may record the information associated with the original URL in any suitable database, such as the memory 70 of FIG. 1, and can map this information to the port that was assigned to the modified URL. This way, the secure application 95 can easily determine the original remote server 205 when it receives the modified URL. In an alternative embodiment, the information of the original data request may not need to be stored and mapped to the redirect address. In the URL example, the original information from the URL can simply be obtained from the modified URL because the original information may be part of the modified information.

Moving back to FIG. 4, in the second step, the modified data access request can cause the system service 115 to direct the request back to the secure application 95, instead of the original remote server 205. That is, the system service 115 will establish a connection with the secure application 95 via the port that the secure application 95 created. In view of the mapping process described above, the secure application 95 is able to determine the original data access request and can establish a connection with the relevant content provider, such as an appropriate remote server 205. In particular, based on the example above, the secure application 95 can determine the original URL request and can open a connection with the location specified by the original URL. This process is reflected in the third step of FIG. 4. At this point, the secure application 95 can fetch the content from the remote server 205 and can return this content to the system service 115 for processing, as shown in the fourth step. The user may then consume the requested data similar to a normal session.

As previously noted, the secure application 95 may be configured to track data usage. In this case, the secure application 95 can determine an amount of data that is carried over the connection that is established with the remote server 205. This can include both incoming (i.e., from remote server 205 to secure application 95) and outgoing (i.e., from secure application 95 to remote server 205) content. For example, the calculation unit 77 of FIG. 1 can work with the secure application 95 to tally the amount of data consumed by this particular session. In addition, because each session associated with this particular secure application 95 can be tracked, a cumulative amount of data usage for the secure application 95 over a certain time period can be determined. This process may also be conducted for all or at least some of the other secure applications 95 that are installed on the computing device 15.

If the secure applications 95 are associated with an enterprise, the enterprise can determine the amount of data usage that is tied to each of its secure applications 95. This feature can enable the enterprise to determine data usage on the device 15 that is solely attributable to it. As a result, data usage tracking associated with the secure applications can be segregated from data usage that originates from the unsecure applications.

In one embodiment, the connection that is established between the secure application 95 and the remote server 205 can be a secure connection. For example, as is known in the art, the secure application 95 can be configured to establish virtual private network (VPN) connections with remote locations. Such a VPN connection is individual to the secure application 95 and is different from a system-level VPN. If desired, however, the connection between the secure application 95 and the remote server 205 is not required to be a secure connection. In addition, in another embodiment, the secure application 95 may use a system-level VPN.

The description above may apply to other protocols that facilitate the exchange of data. For example, HTTPS traffic may also be tracked in accordance with the procedures presented herein. In one embodiment, additional steps can be taken when dealing with HTTPS traffic to ensure accurate and complete accounting. For example, if a user is accessing an HTTPS link through the secure application 95, the original URL may be modified similar to the HTTP examples above, but the connection between the system service 115 and the secure application 95 may be left in the open.

Consider the following example. If an HTTPS request is generated, the secure application 95 can convert the HTTPS request to an HTTP request when the secure application 95 modifies the URL for purposes of directing the system service 115 back to the secure application 95. That is, the secure application 95 can change the connection type of the data request from a secure connection to an open connection when the data request is modified. Referring back to the URL example above, the following HTTPS URL may be received:

http://www.youtube.com/watch?v=uWHRqspFke0

The secure application 95 can determine that this is an HTTPS request and can modify the URL. An exemplary conversion is presented here:

http://localhost:4444?s=www.youtube.com&p=watch&r=v=uWHRqspFke0

As reflected in the string, the HTTPS request is converted to an HTTP request. As a result, the connection between the system service 115 and the secure application 95 can be out in the open. As will be explained below, this feature can enable the secure application 95 to handle re-directs from the remote server 205.

As can also be seen in the string, the "s=" parameter can provide an indication that the original URL was an HTTPS request. Accordingly, when the secure application 95 establishes the connection between it and the remote server 205, an HTTPS connection can be created. In other words, the system service 115 may not be responsible for establishing the HTTPS connection, and the secure application 95 may be in control of any security-related handshaking and getting the encryption keys in place. The session between the secure application 95 and the remote server 205 can be a transport layer security (TLS) connection, which can terminate at the secure application 95.

As explained earlier, the secure application 95 may be configured to arrange VPN connections in an individual manner. Such an application-level VPN can support any type of traffic that is exchanged between the secure application 95 and the remote server 205, including both HTTP and HTTPS streams. In other words, the ability of the secure application 95 to provide an application-level VPN does not impede the ability of the secure application 95 to modify data access requests and then convert them back to their original form, as described above. Further, these techniques can be practiced if the secure application 95 is using a system-level VPN or is not relying on a VPN connection at all.

As is known in the art, some initial data access requests are answered with a re-direct, which instructs the requesting source to another destination to retrieve the desired content. For example, in the case of an HTTP request, the requesting device may receive an HTTP re-direct from the server, which causes the device to generate another HTTP request based on the re-direct destination. In addition, in some cases, a URL playlist may be sent from the server, which may include a plurality of URLs. This particular feature may support HTTP live-streaming, a protocol that enables a client to select from a number of different alternate streams containing the same material encoded at a variety of data rates, which can allow the streaming session to adapt to the available data rate.

In one arrangement, the secure application 95 may be configured to account for these re-directs. For example, if the initial data request is an HTTP request and the remote server 205 returns an HTTP re-direct, the secure application 95 may transform that HTTP re-direct in accordance with the modification process described above. By doing so, the secure application 95 can ensure that the system service 115 establishes the new re-direct connection with the secure application 95. As such, when the secure application 95 detects a re-direct, the secure application 95 can request another socket and port from the operating system to account for the new destination that originates from the re-direct. The secure application 95 can then open a connection between itself and the new (and appropriate) remote server 205. This process can be expanded to account for re-direct playlists, such that socket/port pairs are generated when needed for the URLs that make up the playlists.

As can be gleaned from this example, the secure application 95 may be required to detect the re-directs in the incoming streams. If the original data access request is not based on a secure protocol, like HTTPS, then the secure application 95 is easily able to detect the re-directs. If the original request is based on a secure protocol, however, complications may arise because the traffic being streamed to the system service may be encrypted. As noted above, when dealing with a secure protocol, the termination point for the secure connection can be placed at the secure application 95, not the system service 115. As a result, the secure application 95 can decrypt the incoming traffic and can detect the re-directs, similar to how it would for an unsecure protocol. Thus, as an example, re-directs can be handled for both HTTP and HTTPS.

In some cases, other components may assist in the calculation of data for purposes of usage accounting. For example, some system services 115 may offer notifications based on certain events that may be related to data usage. In one particular example, the secure applications 95 can register for certain callbacks from the system services 115 that are equipped to provide such notifications. As an example, if a data session is initiated through a secure application 95, the system service 115 can provide one or more notifications that inform the secure application 95 of the start of the session and its eventual ending. Statistics related to the amount of data that was consumed during the session can be incorporated into the notifications, which the secure application 95 can use to track its data usage. The overall total usage related to all or at least some of the secure applications 95 can be determined, which can allow the segregation of data consumption between secure and personal profiles, as described earlier. In this case, however, the modification of the data access requests is not required, and the system service may fetch data in its conventional manner. When available with the system services 115, this feature may be useful for data accounting, particularly when application-level VPNs are not incorporated into the secure applications 95.

The description herein has been presented primarily in terms of a secure application 95 handling the modification of data requests and the data usage tracking. The description, however, is not so limited. In particular, these features can be implemented into an unsecure application such that data usage can be tracked for these types of applications on an individual basis. Similarly, the system service that is involved in this process is not limited to a media player. In fact, any system service that is involved in the exchange of data with a remote location may be applicable to the description provided herein. For example, other system services that apply here may include a texting application, a dialer or any other application that facilitates or otherwise supports voice communications, a video or camera application, or a map application or other application that supports mapping features. In fact, the description herein may apply to any type of application, whether secure or unsecure, that may involve the consumption of content or the use of services in which it may be necessary to distinguish between personal use of such content and services and secure or workspace or enterprise use of the content and services.

While various embodiments have been described above, it should be understood that they have been presented by way of example only, and not limitation. It will be understood by those skilled in the relevant art(s) that various changes in form and details may be made therein without departing from the spirit and scope of the subject matter as defined in the appended claims. Accordingly, the breadth and scope of the present subject matter should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method of data usage accounting, comprising:
   in a setting that includes both secure applications and unsecure applications, receiving via one of the secure applications a request to access data, wherein the request is intended for a content provider via a system service;
   intercepting the request that is intended for the content provider via the system service;
   modifying the intercepted request to cause the system service to direct the request back to the secure application instead of the content provider; and
   establishing a connection with the content provider for the request through the secure application to enable data usage accounting of data that is returned by the content provider.

2. The method according to claim 1, further comprising determining an amount of data that is carried over the established connection associated with the secure application.

3. The method according to claim 2, wherein the amount of data that is determined in relation to the secure application is separate from an amount of data that is determined on behalf of one or more unsecure applications.

4. The method according to claim 1, wherein establishing the connection with the content provider comprises establishing a secure connection with the content provider through the secure application.

5. The method according to claim 4, wherein the secure connection with the content provider is a virtual private network (VPN) connection that is individual to the secure application.

6. The method according to claim 1, further comprising:
receiving content from the content provider at the secure application; and
forwarding the received content from the content provider to the system service for processing.

7. The method according to claim 1, wherein modifying the intercepted request comprises modifying an original uniform resource identifier (URI) of the request by changing the URI associated with the content provider.

8. The method according to claim 1, further comprising:
receiving data from the content provider over the established connection;
reading the data to determine whether a redirect from the content provider is present;
if a redirect from the content provider is detected, modifying the redirect from the content provider to ensure that the system service will direct the redirect to the secure application.

9. The method according to claim 8, wherein receiving data from the content provider comprises receiving from the content provider a playlist that includes a plurality of original URIs and modifying the redirect comprises modifying at least some of the URIs of the playlist.

10. The method according to claim 1, wherein the system service is a media playback service and the media playback service is a system application that is also an unsecure application.

11. A method of data usage accounting in a computing device that has one or more secure applications installed thereon, comprising:
receiving an original URI request through one of the secure applications;
intercepting the original URI request;
modifying the original URI request such that the modified original URI request is to be directed back to the secure application once the modified original URI request has been initially processed by a system service; and
tracking data usage associated with the modified original URI request.

12. The method according to claim 11, further comprising:
converting the modified original URI request back to the original URI request; and
establishing a connection between the secure application and a content provider for the original URI request.

13. The method according to claim 11, wherein the computing device also has one or more unsecure applications installed thereon and tracking data usage associated with the modified original URI comprises tracking data usage associated with the modified original URI through the secure application.

14. The method according to claim 13, further comprising segregating the data usage tracking associated with the modified original URI from data usage tracking associated with the unsecure applications.

15. The method according to claim 11, wherein establishing the connection between the secure application and the content provider comprises establishing a secure connection between the secure application and the content provider, wherein the secure connection is individual to the secure application.

16. A computing device, comprising:
a display that is configured to display both secure and unsecure applications that are installed on the computing device;
a processing unit that is communicatively coupled to the display, wherein the processing unit is configured to:
receive a data access request through one of the secure applications, wherein the data request is supported by an unsecure application that is a system service of the computing device;
cause the data access request to be intercepted prior to processing by the unsecure application;
cause the data access request to be modified such that the unsecure application will direct the data access request to the secure application instead of an intended location of the data access request; and
cause a connection between the secure application and the intended location of the data access request to be established; and
a calculation unit communicatively coupled to the processing unit, wherein the calculation unit is configured to determine an amount of data that is associated with the data access request through the secure application.

17. The computing device according to claim 16, wherein the connection between the secure application and the intended location of the data access request is a VPN connection that is individual to the secure application.

18. The computing device according to claim 16, wherein the data access request is a uniform resource locator (URL) based on hypertext transfer protocol (HTTP) or hypertext transfer secure protocol secure (HTTPS).

19. The computing device according to claim 16, further comprising memory, wherein the memory is associated with the secure application and is configured to store the data access request for mapping the data access request to the modified data access request.

20. The computing device according to claim 16, wherein the processing unit is further configured to convert the modified data access request back to its original form to establish the connection between the secure application and the intended location.

* * * * *